United States Patent [19]

Seng et al.

[11] Patent Number: 5,788,015
[45] Date of Patent: Aug. 4, 1998

[54] INDUSTRIAL TRUCK WITH A DRIVER'S SEAT

[75] Inventors: Gert Seng, Reutlingen; Burkhard Fritz, Metzingen, both of Germany

[73] Assignee: Wagner Fordertechnik GmbH & Co. KG, Reutlingen, Germany

[21] Appl. No.: 532,070

[22] Filed: Sep. 22, 1995

[30] Foreign Application Priority Data

Sep. 29, 1994 [DE] Germany .................. 44 34 908.4

[51] Int. Cl.⁶ .................................................. B66F 9/06
[52] U.S. Cl. .................. 187/222; 180/326; 180/329; 180/330; 296/65.1
[58] Field of Search .................. 180/326, 329, 180/330; 187/222; 296/190, 65.1; 297/335, 336, 331

[56] References Cited

U.S. PATENT DOCUMENTS

| | | | |
|---|---|---|---|
| 540,699 | 6/1895 | Smith | 297/335 |
| 1,497,489 | 6/1924 | Cochran | |
| 2,715,434 | 8/1955 | Lukens | 297/331 |
| 3,343,871 | 9/1967 | Yates et al. | 297/331 |
| 3,522,970 | 8/1970 | Francis | 297/335 |
| 4,311,205 | 1/1982 | Goodacre et al. | 296/65.1 |
| 4,478,308 | 10/1984 | Klaassen | 180/326 |
| 4,846,520 | 7/1989 | Acuto et al. | 296/65.1 |
| 5,044,472 | 9/1991 | Dammeyer et al. | 187/9 R |
| 5,195,802 | 3/1993 | Hayakawa et al. | 297/335 |
| 5,275,255 | 1/1994 | Huntley et al. | 180/329 |
| 5,364,151 | 11/1994 | Yurasits | 296/65.1 |
| 5,567,001 | 10/1996 | Zalewski | 296/65.1 |

FOREIGN PATENT DOCUMENTS

| | | | |
|---|---|---|---|
| 0555025 | 8/1993 | European Pat. Off. | B66F 9/075 |
| 1185848 | 3/1970 | United Kingdom | 180/326 |

OTHER PUBLICATIONS

Materials Handling News entitled "How to Pick It", dated Jul. 1977, 2 pp. (26 & 27).

*Primary Examiner*—Joseph E. Valenza
*Assistant Examiner*—Khoi H. Tran
*Attorney, Agent, or Firm*—Webb Ziesenheim Bruening Logsdon Orkin & Hanson, P.C.

[57] ABSTRACT

An industrial truck having a lift mast and a man-carrying platform with a driver's console and a load carrying device are mounted on the lift mast for vertical movement. Control elements and a folding driver's seat are located on the man-carrying platform in the vicinity of the driver's console. The seat portion and the backrest of the driver's seat are arranged so that when the seat is folded up they form a rest member against which the driver can lean when in the standing position. The control elements are located in the vicinity of the driver's seat for ready accessibility by the driver.

4 Claims, 4 Drawing Sheets

INDUSTRIAL TRUCK WITH A DRIVER'S SEAT

BACKGROUND OF THE INVENTION

1. Field of the Invention

This invention relates generally to an industrial truck and in particular to a high-lift truck having a man-carrying platform. The platform has a driver's console and a load carrying device which are connected to a vertical support structure or lift mast. Control elements and a folding driver's seat are located on the man-carrying platform in the vicinity of the driver's console.

2. Brief Description of the Prior Art

High-lift trucks with man-carrying platforms are used in warehouses with high shelves and narrow aisles. Such trucks are employed for the placement and removal of items which are transported to the warehouse for storage on suitable transport vehicles.

The operation of a high-lift truck with a man-carrying platform is controlled by a control console which is located in the vicinity of a rail or a partition between the driver and the load carrying device. The height of the control console can generally be adjusted, so that the vehicle can be operated by a driver in a standing position or a sitting position. For travel over relatively long distances, the driver generally sits down on the seat. When picking up pallets and when placing items on shelves for storage, the driver generally needs to have another view of the load or of the load support forks. These parts of the operation are, therefore, generally performed by the driver in a standing position.

High-lift trucks with man-carrying platforms are also frequently used for consignment operations. In such a case, the driver is required to move individual objects between the load carrying device and the shelves while the driver is in a standing position.

In prior art vehicles having a conventional arrangement of the driver's seat and the control console, the latter activities can only be performed when the driver is in a standing position. That places an unnecessary physical burden on the driver, which can be exacerbated by the constant need for the driver to stand up and sit down.

An object of this invention is to create an industrial truck of the type described above, wherein the physical burden on the driver is reduced by a favorable design of the driver's work space.

SUMMARY OF THE INVENTION

An industrial truck, particularly a high-lift truck with a man-carrying platform, is equipped with a driver's console and a load carrying device which are mounted for movement along a vertical support structure or lift mast. Control elements and a folding driver's seat are located on the platform in the vicinity of the driver's console. The seat and the backrest are arranged so that when the seat portion is folded up, they form a rest member against which the driver can lean. Control elements may be located to one side in the vicinity of the seat portion.

The object of the invention can be accomplished if the driver's seat is a folding seat against which the driver can lean when the seat portion is folded up. When the seat portion is folded down, a complete driver's seat with a backrest is formed which can be used for travel over relatively long distances. When the seat portion is folded up, the driver can relax his legs by leaning back against the folded-up seat which forms a rest member. The driver can then adopt a leaning position to perform the majority of his activities for which, in prior art vehicles, he had to stand unsupported.

In one embodiment of the invention, the control elements are located on the side in the vicinity of the driver's seat. In this arrangement, the conventional control console, which is located in the vicinity of the rail or the partition, and which interferes with the driver's activities during consignment operations, can be eliminated, or at least made significantly smaller.

In another embodiment of the invention, the control elements are located in the upper area of the backrest of the driver's seat on one side of the driver. When the driver is in the leaning position, the control elements are easy for the driver to reach with his arms in a relaxed position.

In a particularly favorable embodiment of the invention, the control elements are fastened to the forward area of the seat portion of the driver's seat. In this arrangement the control elements are within each reach when the driver is leaning against the seat with a folded-up seat portion and when the driver is seated on the folded-down seat portion.

The height of the driver's seat and/or of the control elements is preferably vertically adjustable. The positions of the driver's seat and of the control elements can thus be adjusted to correspond to the stature of individual drivers.

The control elements are preferably rotating levers or buttons.

In one refinement of the invention, at least one control console with additional control elements is located in the vicinity of the driver's console.

Additional advantages and details of the invention are explained in greater detail below, with reference to the accompanying drawings wherein like reference characters refer to like parts:

DESCRIPTION OF PREFERRED EMBODIMENTS OF THE INVENTION

Figure 1:
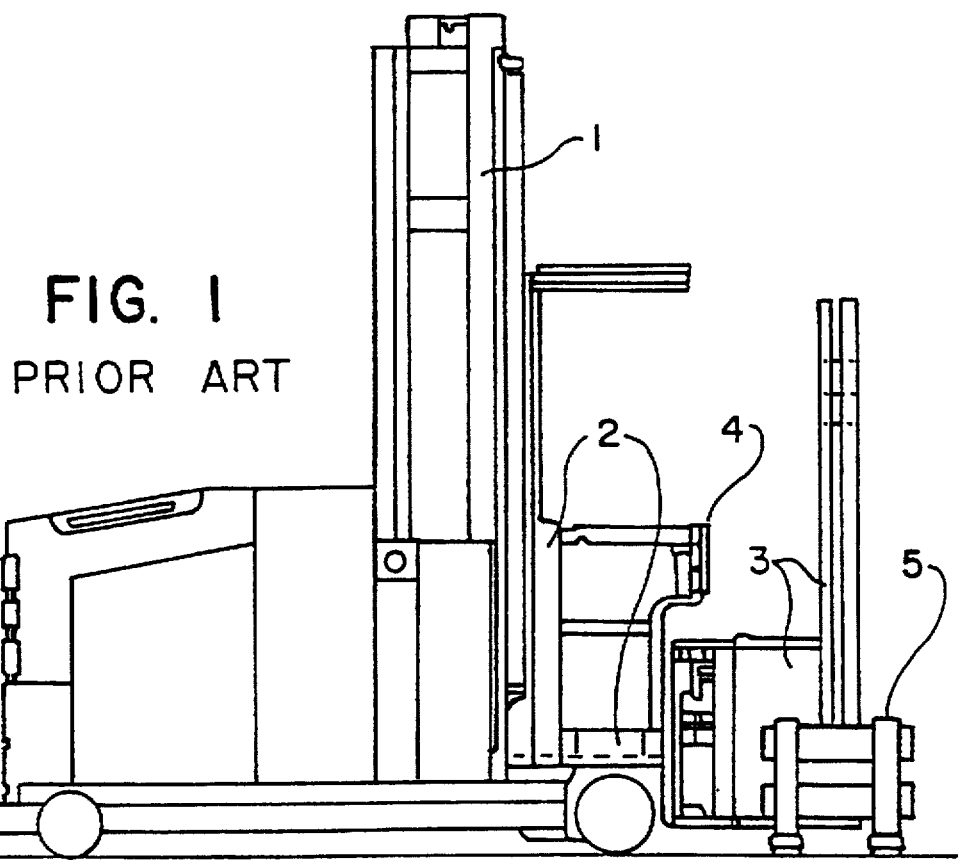
FIG. 1 is a side elevation view of a prior art high-lift truck with a man-carrying platform.
Figure 2:
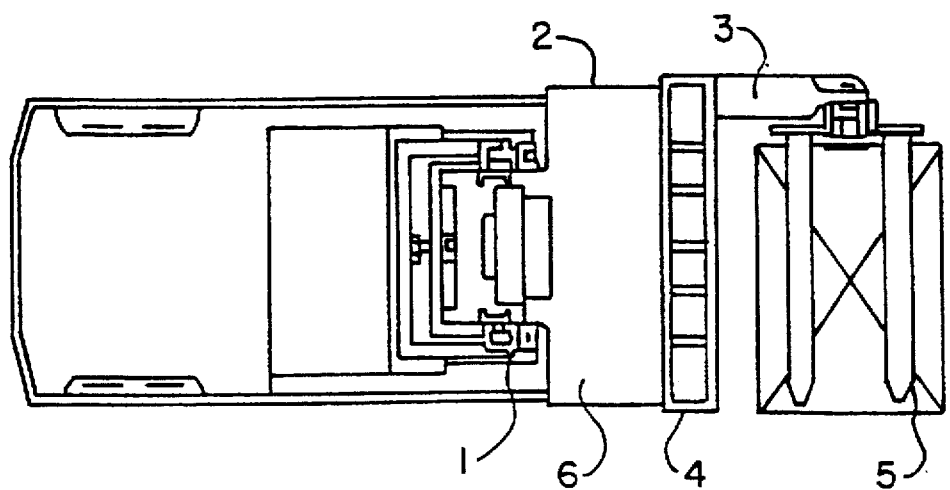
FIG. 2 is a top plan view of a prior art high-lift truck with a man-carrying platform.

FIGS. 1 and 2 of the drawings show a prior art high-lift truck with a man-carrying platform having a driver's control platform 2 which can be raised and lowered on a vertical support structure or lift mast 1. A fork type load carrying device 3 is raised along with the driver's control platform 2. A rail or partition 4 is located between the driver's control platform 2 and the load carrying device 3. A fork 5 on the load carrying device 3 can be moved horizontally and vertically relative to the driver's control platform 2 and can also be rotated in a substantially horizontal plane. The man-carrying platform includes a conventional folding driver's seat.

Figure 3:
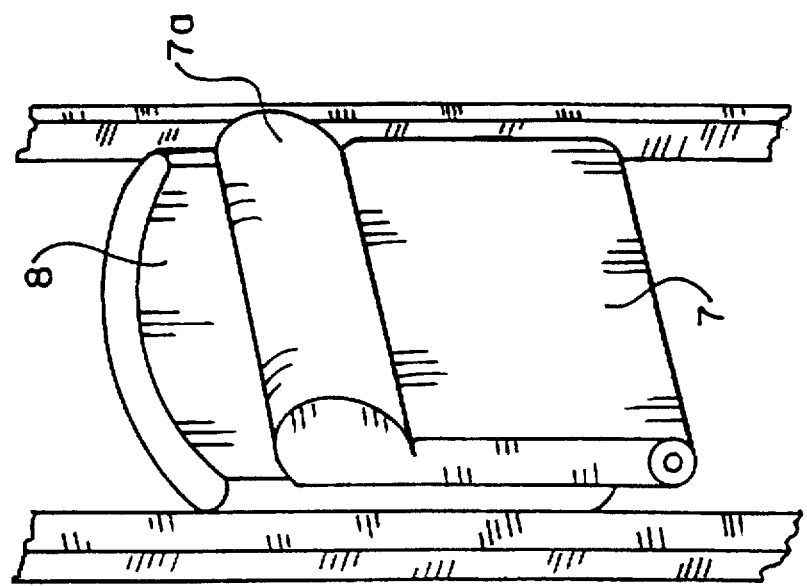
FIG. 3 is a perspective view of a folding seat according to the invention in the folded-up position.

FIG. 3 of the drawings shows a folding driver's seat in the folded-up position. The seat portion 7 and the backrest 8 are oriented so that when the seat portion 7 is folded up, seat portion 7 and backrest 8 together form a seat or rest member against which the driver can lean. The outer end area 7a of the seat portion 7 is designed so that the driver can lean against it as shown in FIG. 5 of the drawings.

Figure 4:
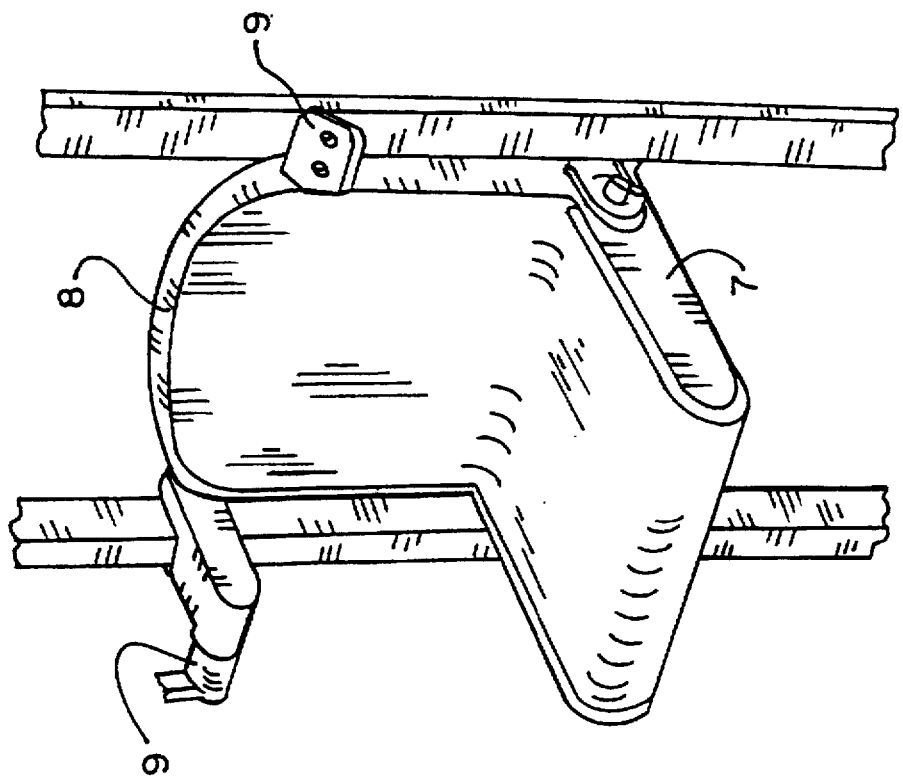
FIG. 4 is a perspective view of a folding seat according to the invention with control elements in the vicinity of the seat backrest.

FIG. 4 of the drawings shows a folding seat according to the invention in the folded down position with control elements in the vicinity of the backrest. The control elements 9, which may be rotating levers and buttons, are located in the vicinity of the backrest, so that they can be operated easily by the driver from a leaning position when the seat portion 7 is folded up as shown in FIGS. 3 and 5 of the drawings.

Figure 5:
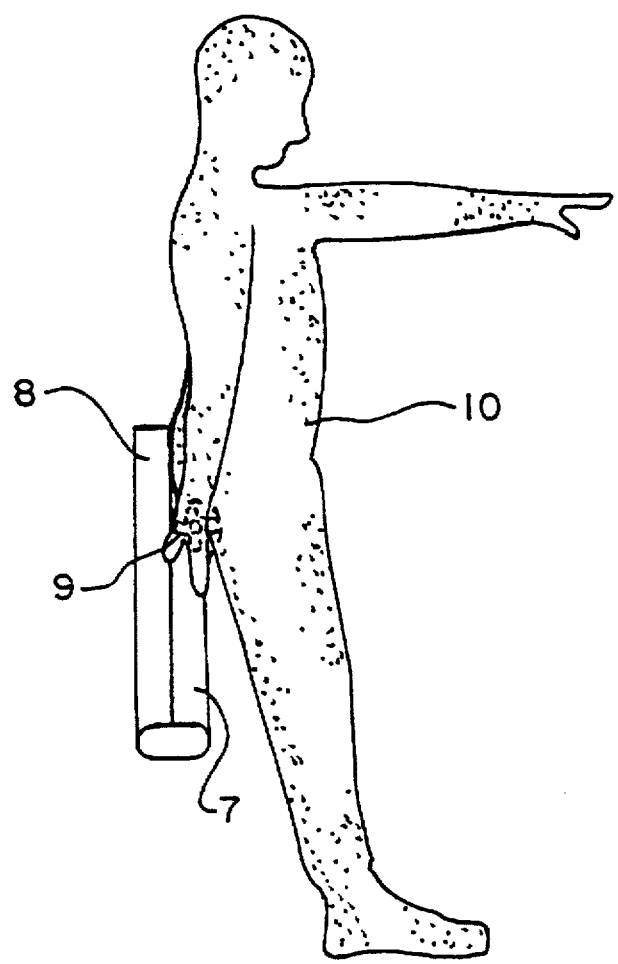
FIG. 5 is an elevation view of a driver in the leaning position.

FIG. 5 of the drawings shows a driver 10 leaning against the folded seat. The driver 10 leans back against the folded-up seat portion 7 and against the backrest 8. The control elements 9 are directly accessible in the driver's hands.

Figure 6:
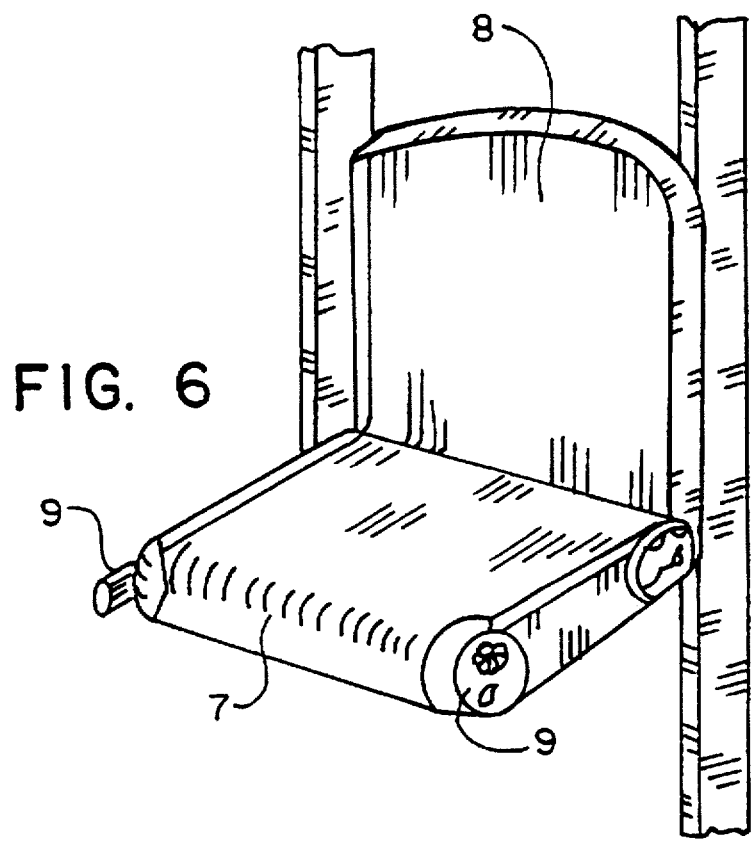
FIG. 6 is a perspective view of a folding seat according to the invention with control elements on the forward area of the seat portion of the folding seat.

FIG. 6 of the drawings shows a folding seat according to the invention with control elements at the forward end of the seat portion 7. The control elements 9 are integrated into the seat portion 7.

Figure 7:
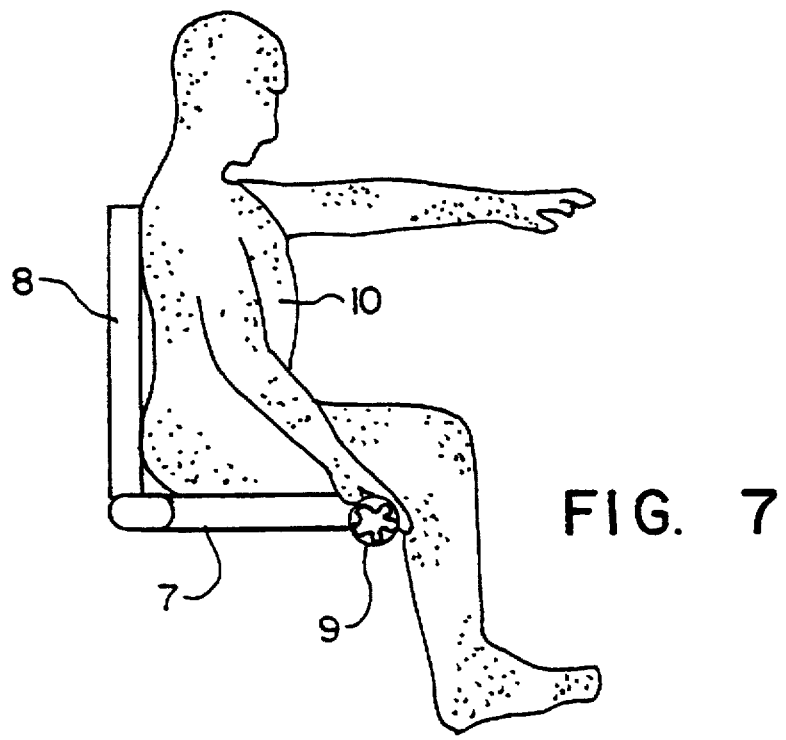
FIG. 7 is an elevation view of a driver in the seated position.

FIG. 7 of the drawings shows a driver sitting in the seat. Since the control elements 9 are integrated into the seat portion 7 they are readily accessible to the driver. When the seat portion 7 is folded up, the control elements 9 are pivoted up with it so that they remain within the driver's reach when the driver is in a leaning position, as shown in FIG. 5 of the drawings.

Having described a presently preferred embodiment of the invention, it is to be understood that it will be otherwise embodied within the scope of the appended claims.

We claim:

1. An industrial high-lift truck including a lifting mast, a combination man-carrying platform having a driver's console and a load carrying device fastened to said lifting mast for vertical movement along said lifting mast, a folding driver's seat located in the vicinity of said driver's console, and control elements in the vicinity of said driver's seat, whereby the driver can lean against said seat when said seat is folded up and said control elements are readily accessible to the driver and wherein said driver's seat includes a seat portion having a forward area and said control elements are supported and fastened to the forward area on a side of said seat portion of said driver's seat which is farthest from a pivot of said folding seat, whereby said control elements are supported and located in the forward area of said folding seat for easy accessibility to the driver.

2. An industrial high-lift truck as set forth in claim 1, wherein said control elements are rotating levers.

3. An industrial high-lift truck as set forth in claim 1, including at least one control console with additional control elements located in the vicinity of said driver's console.

4. An industrial high-lift truck including a lifting mast, a combination man-carrying platform having a driver's console and a load carrying device fastened to said lifting mast for vertical movement along said lifting mast, a folding driver's seat located in the vicinity of said driver's console, and control elements located in the vicinity of said driver's seat, whereby the driver can lean against said seat when said seat is folded up and said control elements are readily accessible to the driver, and wherein said driver's seat includes a seat portion having a forward area and said control elements are supported and fastened to the forward area on a side of said seat portion of said driver's seat which is farthest from a pivot of said folding seat, whereby said control elements are located and supported in the forward area of said folding seat for easy accessibility to the driver and wherein a height of said driver's seat is adjustable in relation to the man-carrying platform.

* * * * *